United States Patent [19]

Law et al.

[11] Patent Number: 5,607,747
[45] Date of Patent: Mar. 4, 1997

[54] MAGNETIC RECORDING MEDIA HAVING A BACKSIDE COATING WHICH INCLUDES MULTICOMPONENT, NONMAGNETIC PARTICLES

[75] Inventors: Kam W. Law, Woodbury; James A. Greczyna, Vadnais Heights; Leslie M. Wolff, St. Paul; Milind B. Sabade, Maplewood; Kevin R. Katzenmaier, Woodbury, all of Minn.

[73] Assignee: Minnesota Mining and Manufacturing Company, St. Paul, Minn.

[21] Appl. No.: 228,221

[22] Filed: Apr. 15, 1994

[51] Int. Cl.⁶ .................................. G11B 5/66; G11B 5/70
[52] U.S. Cl. .......................... 428/141; 428/143; 428/217; 428/313.9; 428/314.2; 428/402; 428/694 TB; 428/694 TR; 428/694 BB; 428/694 BR; 428/694 BN; 428/900
[58] Field of Search ................................ 428/325, 314.2, 428/315.5, 313.3, 313.9, 402, 403, 694 BB, 694 BR, 694 BN, 141, 217, 900, 143, 694 TB, 694 TR

[56] References Cited

U.S. PATENT DOCUMENTS

| | | | |
|---|---|---|---|
| 4,268,320 | 5/1981 | Klingaman et al. | 106/288 B |
| 4,294,750 | 10/1981 | Klingaman et al. | 260/40 R |
| 4,328,935 | 5/1982 | Steel | 242/192 |
| 4,414,270 | 11/1983 | Miyoshi et al. | 428/325 |
| 4,612,235 | 9/1986 | Ushimaru et al. | 428/216 |
| 4,734,325 | 3/1988 | Ryoke et al. | 428/323 |
| 4,734,326 | 3/1988 | Nishimatsu et al. | 428/328 |
| 4,770,932 | 9/1988 | Matsumoto et al. | 428/323 |
| 4,780,365 | 10/1988 | Kakuishi et al. | 428/323 |
| 4,871,606 | 10/1989 | Matsuura et al. | 428/147 |
| 5,008,147 | 4/1991 | Ryoke et al. | 428/323 |
| 5,208,091 | 5/1993 | Yanagita et al. | 428/141 |
| 5,219,652 | 6/1993 | Shimasaki | 428/323 |
| 5,294,495 | 3/1994 | Kuroda et al. | 428/694 B |
| 5,407,725 | 4/1995 | Ryoke et al. | 428/141 |

FOREIGN PATENT DOCUMENTS

| | | |
|---|---|---|
| 0515902A1 | 5/1992 | European Pat. Off. |
| 60-121515 | 11/1985 | Japan |
| 61-68728 | 6/1986 | Japan |
| 3-278313 | 8/1991 | Japan |
| 4-251427 | 3/1992 | Japan |
| 5-282655 | 10/1993 | Japan |

*Primary Examiner*—Paul J. Thibodeau
*Assistant Examiner*—Stephen Sand
*Attorney, Agent, or Firm*—Gary L. Griswold; Walter N. Kirn; Daniel C. Schulte

[57] ABSTRACT

A magnetic recording medium comprising a support having two major surfaces, a magnetic layer provided on one major surface of the support, and a backside coating provided on the other major surface of the support wherein the backside coating comprises nonmagnetic, multicomponent particles dispersed in a polymeric binder. The nonmagnetic, multicomponent particles are comprised of a first component having a Mohs hardness equal to or less than 7 and a second component having a Mohs hardness greater than 7.

25 Claims, No Drawings

MAGNETIC RECORDING MEDIA HAVING A BACKSIDE COATING WHICH INCLUDES MULTICOMPONENT, NONMAGNETIC PARTICLES

FIELD OF THE INVENTION

The present invention relates to magnetic recording media, and in particular, to a backside coating of magnetic recording media wherein the backside coating includes a particulate filler.

BACKGROUND OF THE INVENTION

Magnetic recording media such as audio and video magnetic recording tapes and computer cartridge tapes are constructed of a magnetic recording layer provided on a nonmagnetic support. The performance of a magnetic recording medium depends, in part, upon the surface characteristics of the backside surface of the support. When the backside surface of the support is too smooth, the coefficient of friction between the support and the guide surfaces of the playing/recording apparatus tends to be substantially increased. As a result, the running properties of the magnetic recording medium suffer and the normal recording and reproduction of signals is hindered. In order to overcome this problem, a backside coating may be coated on the backside of the nonmagnetic support to provide a roughened, uneven surface and thereby reduce the coefficient of friction of the backside surface.

Backside coatings generally include a nonmagnetic pigment dispersed in a binder. Researchers have proposed that the inclusion of such pigments, in various amounts and sizes and of specific Mohs hardness values, will improve the performance characteristics of magnetic recording media. Mohs hardness refers to the hardness scale which ranks standard minerals according to their relative ability to scratch one another. See 12 Kirk-Othmer, Encyclopedia of Chemical Technology 124 (3d ed. 1980).

U.S. Pat. No. 5,208,091 (Yanagita et al.) describes protrusions in the backside coating layer of a magnetic recording medium which are said to improve running durability and diminish the lowering of a radio frequency (RF) output. Yanagita et al. list several non-magnetic particles as being useful. Inorganic particles listed are those comprising silicon oxide, titanium oxide, aluminum oxide, chromium oxide, silicon carbide, calcium carbide, zinc oxide, $\alpha$-$Fe_2O_3$, talc, kaolin, calcium sulfate, boron nitride, zinc fluoride, molybdenum dioxide, calcium carbide, and barium sulfate. Organic powders said to be useful in combination with the above inorganic particles include those of benzoguanamine type resin, a melamine resin, a phthalocyanine type pigment and carbon black. Yanagita et al., col. 5 lines 27–45.

U.S. Pat. No. 5,219,652 (Shimasaki) describes decreasing and stabilizing the coefficient of friction in a magnetic recording medium by including spherical particles in the backside coating. According to Shimasaki, the particles can be chosen from spherical particles of silicon dioxide, thermal black, fine particles of melamine formaldehyde condensation product and the like. Shimasaki, col. 2 lines 62–67. Shimasaki states that when the above-mentioned spherical particles are added to the backcoat layer, numerous "studs" are formed on the surface of the back coat layer, resulting in a "small touching area," which results in a low coefficient of friction. Shimasaki col. 3 lines 15–20.

U.S. Pat. No. 4,871,606 (Matsuura et al.) describes a back coat layer comprising a binder and non-magnetic particles dispersed therein. The particles are characterized in that they comprise a mixture of at least one soft inorganic pigment of less than 5 in Mohs scale of hardness, and at least one hard inorganic pigment of not less than 5 in Mohs scale of hardness. This combination of hard and soft particles is said to give suitable abrasion resistance. Matsuura et al., col. 1–2.

U.S. Pat. No. 4,268,320 (Klingaman et al.) describes a particulate material composed of regular, well defined ellipsoidal particles, and a method of making this particulate material. The particles are said to be generally useful as a filler for polymeric media. Klingaman et al., col. 4 lines 7–8. The invention further includes composites of these particles with one or more polymeric media. Klingaman et al., col. 5 lines 3–15.

SUMMARY OF THE INVENTION

The prior art provides the skilled artisan with various particles which may be included in the backside coating of a magnetic recording media to improve the running properties of the media. However, many of these particles are so hard that they can be too abrasive and can cause excessive wear to mechanisms within a recording/playback device. The use of softer particles can result in different problems, for instance, higher coefficients of friction and a lack of durability of the backside coating. With the present invention, the inventors incorporate into a magnetic recording medium's backside coating multicomponent, nonmagnetic particles which combine the characteristics of both softer and harder compounds, but which attain running properties superior to media without such multicomponent particles.

The present invention provides that nonmagnetic, multicomponent particles, dispersed in the backside coating of magnetic recording media, will improve the running properties of those media as compared to media with various other single-component backside fillers. The improved running properties of magnetic recording media of the present invention include the following: improved tape tension and drive force values; improved and stabilized coefficient of friction; improved air bleed properties; improved pack shift, stacking, guiding, and tape path drag properties; improved cleanliness; and reduced dropouts per square inch (DPSI) in relation to other magnetic media without such multicomponent particles.

An aspect of the present invention is a magnetic recording medium having a support with two major surfaces, a magnetic layer provided on one major surface of the support, and a backside coating provided on the other major surface of the support. The backside coating includes nonmagnetic particles dispersed in a binder. The nonmagnetic particles have at least two components. A first component of the particles has a Mohs hardness equal to or less than 7, and a second component of the particles has a Mohs hardness greater than 7.

DESCRIPTION OF THE INVENTION

Magnetic recording media of the present invention are constructed of a support having two major surfaces. One major surface of the support is coated with a magnetic layer and the other major surface is coated with a backside coating.

The support used in the practice of the present invention may be formed from any material known to be useful in the production of magnetic recording media. Examples of suitable support materials are polymers such as polyethylene terephthalate (PET), polyimide, and polyethylene naphtalate (PEN); or any other suitable material. The thickness of the support may vary, but supports of thicknesses in the range from 0.5 to 14.0 μm are generally suitable.

The magnetic layer of the present invention may be any conventional magnetic layer known to be suitable in the production of magnetic recording media. The layer may be a metal evaporated layer, or in the alternative, the magnetic layer may be a particulate coating comprising a magnetic pigment dispersed in a polymeric binder. Such pigment may be any suitable magnetic pigment known in the art including, but not limited to, magnetic iron oxides such as $\gamma$-$Fe_2O_3$, Co-containing $\gamma$-$Fe_2O_3$, $\gamma$-$Fe_3O_4$, Co-containing $\gamma$-$Fe_3O_4$; $CrO_2$; barium ferrites; or metal magnetic powder principally comprising Fe, Ni, and Co, e.g., Fe—Ni—Co alloy, Fe—Ni alloy, Fe—Al alloy, Fe—Al—Zn alloy, Fe—Al—Ni—Co alloy, Fe—Al—Ni—Cr alloy, Fe—Al—Co—Cr alloy, Fe—Co—Ni—Cr alloy, Fe—Co—Ni—P alloy, and Co—Ni alloy. In various embodiments of the present invention, the magnetic layer may be comprised of one or more separate layers. See e.g., Yanagita et al. 5,208,091, col. 4 lines 22–33.

The backside coating of the present invention comprises nonmagnetic particles dispersed in a binder. Any conventional binder known to be useful in the production of magnetic recording media may be used as a binder in backside coatings of the present invention. Preferred binders are, for example, polymeric binders, or combinations of polymeric binders, known to be useful in the production of magnetic recording media. The amount of binder used may vary, but a useful amount is generally within the range from 30 to 60 parts by weight (pbw), a preferable amount is within the range from 35 to 55 pbw, and a particularly preferred amount is within the range between 35 to 43 pbw, based on 100 parts backside coating. The weight of the backside coating is based upon the dried weight of the coating. Thus, the weight of the backside coating includes, e.g., the weight of the binders, pigments, nonmagnetic particles, surfactants, antistatic agents, and the like, but excludes the weight of solvents used to facilitate coating.

Nonmagnetic, multicomponent particles are added to backside coatings of the present invention in order to improve the running properties of a magnetic recording media. While not wishing to be bound by theory, multicomponent particles are believed to be so advantageous by combining relatively hard and relatively soft components into the same particle. Particles consisting of only a single, relatively harder component, e.g. $Al_2O_3$ particles, are known to reduce friction between the backside and guide pins, and are considered to be stable over time. But harder particles, especially those having jagged edges, can be excessively abrasive. Particles consisting of a single, relatively soft component, e.g., $\alpha$-$Fe_2O_3$, on the other hand, are less abrasive than harder particles, but may not be effective in reducing friction, and may actually increase friction. Softer particles are also considered to provide a less stable backside coating. In the practice of the present invention, combining these various harder and softer components into a single particle creates the synergistic effect of improving frictional properties, while at the same time reducing the abrasiveness of the backside coating.

Particles useful in the practice of the present invention are nonmagnetic particles containing at least two components, wherein a first component has a Mohs hardness of less than or equal to 7, and a second component has a Mohs hardness greater than 7. The first component can be comprised of, for example, one or more of $SiO_2$, $TiO_2$, $CaCO_3$, $\alpha$-$Fe_3O_4$ $\alpha$-$Fe_2O_3$, $ZrO_2$, NiO, $Fe_2SiO_4$, or mixtures thereof, preferably $SiO_2$, $\alpha$-$Fe_2O_3$, and $TiO_2$, and most preferably of $SiO_2$. The second component may be comprised of, for example, one or more of $Al_2O_3$, Topaz ($Al_2SiO_3(OH,F)_2$), $MgAl_2O_4$, SiC, Diamond, and $BeAl_2O_4$ or mixtures thereof, and is preferably $Al_2O_3$. The relative amounts of each particle component can vary, but the weight ratio of first component to second component material is preferably in the range from 1:9 to 9:1, and is most preferably within the range from 1:1 to 3:1.

Preferred nonmagnetic particles are particles wherein the first component of the particle is $SiO_2$ and the second component is $Al_2O_3$. Further preferred nonmagnetic particles are particles, further comprising a third component, wherein the first component is $SiO_2$, the second component is $Al_2O_3$, and a third component is chosen from the group consisting of $\alpha$-$Fe_2O_3$, $TiO_2$, $ZrO_2$, and $Fe_2SiO_4$, with the third component preferably being $\alpha$-$Fe_2O_3$. The third component can be present in any amount, but the weight ratio of first component to third component material is preferably in the range from 2:1 to 99:1, and is most preferably within the range from 4:1 to 19:1.

Further preferred nonmagnetic particles are particles comprising four components, wherein the first component of the particles is $SiO_2$, the second component is $Al_2O_3$, the third component is $\alpha$-$Fe_2O_3$, and a fourth component is chosen from the group consisting of $TiO_2$, $ZrO_2$, and $Fe_2SiO_4$, with the fourth component preferably being $TiO_2$. The fourth component can be present in any amount, but the weight ratio of first component to fourth component material is preferably in the range from 9:1 to 99:1, and is most preferably within the range from 19:1 to 99:1.

The nonmagnetic particles of the present invention are most preferably derived from ZEEOSPHERES™ brand hollow ceramic microspheres, commercially available from 3M Specialty Additives Division. These particles comprise about 47 pbw of a first $SiO_2$ component, about 29 pbw of a second $Al_2O_3$ component, about 7 pbw of a third $\alpha$-$Fe_2O_3$ component, and about 2 pbw of a fourth $TiO_2$ component. ZEEOSPHERES™ brand hollow ceramic microspheres are commercially available in a variety of sizes, and are preferably milled before use in order to provide multicomponent particles of a desired size distribution.

Milling may be accomplished by means of any milling apparatus known to be useful in sizing nonmagnetic particles, for example, a Netzsch Horizontal Sandmill. Where ZEEOSPHERES brand hollow ceramic microspheres are used, the particles are substantially spherical before milling. As used in this application, "substantially spherical" means that particles have a Krumbein roundness of at least 0.8. While not wishing to be bound by theory, evaluations indicate that during milling, larger spheroids are broken up, leaving smaller spheroids substantially unbroken. The spherical nature of these nonmagnetic, multicomponent particles is thought to allow the particles to act similar to ball bearings when contacting mechanisms of a magnetic recording/playback device. As compared to the jagged edges of conventional nonmagnetic particles used in backside coatings, these substantially spherical particles produce a backside coating with advantageous frictional and running properties.

Nonmagnetic, multicomponent particles can be present in any amount sufficient to provide enhanced frictional properties of a backside coating. If too few particles are added, the backside surface will remain too flat, and little or no improvements will be achieved. However, using too many backside particles has been known to cause undesired performance problems, e.g. increased bit error rate due to embossing of the magnetic layer. The optimum amount may vary depending upon many factors, including the specific media formats involved (e.g. digital video tape, computer tape, audio tape, and the like), the speed the media is run at (e.g. digital video is run at 5 inches per second (ips), data cartridge tapes are run between 25 and 120 ips), the nature and hardness of the guide rolls and guide pins within a recording/playback device, the wrap angle of the medium around guide rolls and guide pins, and to a lesser degree, the interface between the medium and the recording and playback heads. Therefore, for different media, and different formats of media, the optimum level of particles may be different.

Generally, useful amounts of nonmagnetic, multicomponent particles of the present invention are amounts up to about 12 pbw, based on 100 parts backside coating. In one embodiment of the present invention particularly suited for use in digital video recording media, the preferred amount of nonmagnetic, multicomponent particles is within the range from 0.25 to 2 pbw and most preferably within the range from about 0.50 to 0.75 pbw based upon 100 parts backside coating weight. In another embodiment particularly suited for use in computer cartridge tape, the preferred amount of nonmagnetic, multicomponent particles is about 7 to 11 pbw based on 100 parts backside coating weight, and the most preferred amount is in the range from about 7 to 9 pbw.

Other factors also contribute to the effectiveness of nonmagnetic particles in backside coatings. For example, the size of the particles in a backside coating, the roughness of the backside, and/or the ratio of particle size to backside coating caliper may affect the running properties of a magnetic recording medium. In the practice of the present invention, particle size means the mean particle size as measured by a Microtrac II particle size analyzer, commercially available from Leeds & Northrup Co. The Microtrac II determines the volume of the particles, and expresses this measurement in terms of a representative mean particle size (diameter), in microns.

The size of the nonmagnetic, multicomponent particles used in the practice of the present invention may be any size which, when included in the backside coating of a magnetic recording medium, will improve the running properties of that magnetic recording medium. These particles generally have a mean particle size in the range from about 0.1 to 4 µm, with in the range from about 0.4 to 1.2 µm being preferred, and the range from about 0.95 to 1.05 µm being most preferred.

The roughness of a backside coating has been found to be a major factor in affecting the frictional and running properties of a magnetic recording medium. A moderately rough backside coating is preferred. A moderately rough backside surface will decrease the contact area between the magnetic recording medium and guide surfaces in the recording/ playback device, thereby resulting in reduced friction between these surfaces. However, too rough of a backside coating can cause a new set of problems. For instance, a rough backside might cause defects in the magnetic side of the medium due to embossing. Further, evaluations have shown that excessively rough backside coatings can result in running properties, e.g. capstan voltages, inferior to backside coatings containing no particulate filler at all. Therefore, an optimum backside coating roughness is a surface rough enough to decrease the contact area between the medium and internal mechanisms of a recording/playback apparatus, but not so rough that other running properties are adversely affected.

In the practice of the present invention, roughness (Rq) of the backside coating can be measured by a Rodenstock Model RM600 Laser Stylus. Generally, useful backsides may have roughness values up to 0.6 micron. However, as with useful amounts of nonmagnetic, multicomponent particles, the optimal roughness of backside coating depends upon various factors and will be different for different media and formats (see discussion p. 7 first paragraph).

In one embodiment of the present invention particularly suited for use in digital video recording media, the roughness is preferably in the range from about 0.1 to 0.22 microns, most preferably within the range from about 0.1065 to 0.15. In another embodiment particularly suited for use in computer cartridge tape, the roughness value is preferably in the range from about 0.05 to 0.6 microns, most preferably in the range from about 0.2 to 0.4 microns.

Any ratio of mean particle size to backside coating caliper might be useful in the practice of the present invention. However, this value can affect the running properties of backside coatings of the present invention. While not wishing to be bound by theory, nonmagnetic, multicomponent particles in a backside coating are thought to be useful in that they create a controlled roughness of the backside by causing protrusions of the underlying polymer coating. These protrusions act as load bearing surfaces. In relation to the depth of the backside coating, nonmagnetic, multicomponent particles are preferably of a size large enough to barely protrude from the surface of the coating. If the thickness of the coating is much larger than the diameter of the particles, the particles will be buried, and consequently may be less effective. Contrariwise, if the polymer coating is too shallow in relation to the size of the particles, major portions of the individual particles will protrude from the coating. In this case, many negative effects are possible. The surface of the coating becomes very uneven, causing a high coefficient of friction. The protruding particles can cause embossing of a magnetic recording tape's magnetic coating, or can transfer to the magnetic coating, in either case dropouts could result. Further, particles which are not sufficiently bound by the polymer tend to break free during use, leading to poor cleanliness values and unstable frictional properties. In consideration of the above factors, a preferred ratio of average particle size to backside coating thickness is between about 0.75 and 1.25, and most preferably, the mean particle size is substantially equal to the thickness of the backside coating.

In addition to the polymeric binders and nonmagnetic particles, backside coatings of the present invention may also include other conventional additives such as catalysts, cross linkers, wetting agents, thermal stabilizers, antioxidants, antistatic agents, surfactants, coating aids, other nonmagnetic pigments, dispersants, fungicides, bactericides, lubricants, and the like, in accordance with practices known in the art.

Pigments which may be useful are, for example, carbon black, $Al_2O_3$, $TiO_2$, and the like. The amount of pigment used can vary, but is preferably within the range from 30 to 55 pbw and most preferably within the range from 45 to 50 pbw, based on 100 parts backside coating. In one preferred embodiment, the backside coating comprises $TiO_2$ particles in addition to the binder component and multicomponent, nonmagnetic particles.

The backside dispersion may be compounded and coated by any conventional methods known in the art to be suitable for compounding and coating backside dispersions. For example, the ingredients of the backside coating can be combined and mixed with a suitable solvent to form a substantially homogeneous dispersion. Depending upon convenience, the addition and incorporation of the particles into the dispersion may occur at various times during the compounding process. For example, the particles may be added and dispersed at the same time as any crosslinker or catalyst, such as immediately prior to coating. Alternatively, the particles may be added well in advance of the coating, for example, 24 hours prior to coating.

Next, the dispersion can be applied to the nonmagnetic support, which may be primed or unprimed. The dispersion may be applied to the support by any conventional coating method, such as, for example, gravure coating techniques, modifications of gravure coating techniques, hydro-pneumatic coating techniques, and the like. The dispersion may be coated at various thicknesses, with useful dry caliper values being in the range from about 0.63 to 1.5 μm and a caliper of between about 1.0 to 1.25 μm being preferred. The coated support may then be passed through a drier, calendered if desired, and then allowed to cure. If radiation curable materials are used in the backside coating, the backside coating may also be exposed to a suitable source of radiation, e.g., electron beam radiation.

The present invention will now be further described by the following illustrative examples.

EXAMPLE 1

Samples of magnetic recording tape (Control 1, Comparisons 1, 2, 3, and Samples 1, 2, 3, 4, 5) were produced from the ingredients reported in Table 1. Backside dispersions were produced by separately preparing Particle Charges and Main Charges (Control 1 had no Particle Charge). The Particle Charges were dispersions of particles obtained by mixing and then milling the ingredients to produce a dispersion having appropriately sized particles. The $\alpha$-$Fe_2O_3$, $TiO_2$ and ZEEOSPHERES™ particles for Comparisons 1, 2, 3, and Samples 1, 2, 3, 4, 5, were milled to mean particle sizes of 1.1, 0.94, 0.94, and 0.98, 0.92, 1.0, 1.0, 1.0 μm respectively. After milling, each particle charge was diluted with MEK. Main Charges were prepared for each backside by milling carbon and/or $TiO_2$ components at 28+/−1.0% solids in 75/10/15 MEK/toluene/cyclohexanone, in a horizontal sandmill until smooth, and then thoroughly mixing in the polymers, wetting agents, dispersants, and pigments. After mixing, each Main Dispersion was diluted to 17+/−1.0% solids with 75/10/15 MEK/toluene/cyclohexanone.

For all backsides except Sample 2, Charge D was added to the Main Charge just prior to coating. The Particle Charges, (except for Sample 2) were also added to the Main Charge at this time. For Sample 2, the Particle Charge was added to the Main Charge one day before coating, and the Charge D was added during coating.

After all charges for each backside dispersion were added and thoroughly mixed, each dispersion was coated onto a support which was passed through an oven at a temperature of approximately 180° F. The magnetic layer was then coated on the opposite surface of the support, and the support passed through ovens heated to between 130° and 180° F. The tape was then calendered at a temperature of between 85° and 110° F., and a pressure of between 950 and 1200 pli.

TABLE 1

| | | Control | Comparison | | | Sample | | | | |
|---|---|---|---|---|---|---|---|---|---|---|
| Charge | Ingredient | 1 | 1 | 2 | 3 | 1 | 2 | 3 | 4 | 5 |
| Particle Charge | $\alpha$-$Fe_2O_3$ | 7.99 | | | | | | | | |
| | $TiO_2$ | | 1.91 | | 7.05 | | | | | |
| | X-60 ZEEOSPHERES ceramic microspheres | | | | | 0.50 | 0.75 | 1.88 | 6.73 | 8.00 |
| | Emcol Phosphate from Witco Corp. | | | | | 0.04 | 0.06 | 0.018 | 0.06 | 0.16 |
| | Phosphorylated Polyoxyalkyl Polyol** (75% solids in MEK) | | 0.079 | | | 0.04 | 0.06 | 0.018 | 0.067 | 0.16 |
| | VAGH vinyl chloride resin from Union Carbide (31.6% solids in MEK) | | | 0.196 | 0.724 | | 0.09 | 0.06 | 0.20 | |
| | RJ-100 styrene-allyl alcohol copolymer from Monsanto (30% solids in MEK) | | 0.160 | 0.457 | 1.688 | | | | | |
| | Hydroxy-functional polyurethane (40% solids in MEK) | | | 0.653 | 2.411 | | | | | |
| | Percent solids after dilution with MEK | | 75 | 67 | 67 | 67 | 65 | 65 | 65 | 67 |
| Main Charge | $TiO_2$ | 9.87 | 9.16 | | | 9.81 | 9.80 | | | 9.05 |
| | Vulcan XC-72 | 39.48 | 36.6 | 38.16 | 35.26 | 39.27 | 39.17 | 37.7 | 33.6 | 36.2 |

TABLE 1-continued

| | | Control | Comparison | | | Sample | | | | |
|---|---|---|---|---|---|---|---|---|---|---|
| Charge | Ingredient | 1 | 1 | 2 | 3 | 1 | 2 | 3 | 4 | 5 |
| | Carbon black from Cabot Corporation (30 nm) | | | | | | | | | |
| | Hydroxy-functional polyurethane (40% solids in MEK) | 15.52 | 14.4 | 18.18 | 16.19 | 15.44 | 15.40 | 18.8 | 18.6 | 14.3 |
| | RJ-100 styrene-allyl alcohol copolymer from Monsanto (30% solids in MEK) | 10.81 | 10.1 | 12.72 | 11.33 | 10.81 | 10.78 | 13.18 | 13.01 | 9.97 |
| | VAGH vinyl chloride resin from Union Carbide (31.6% solids in MEK) | 4.65 | 4.33 | 5.45 | 4.86 | 4.65 | 4.64 | 5.65 | 5.58 | 4.27 |
| | Lecithin (55% solids in toluene) | 2.28 | 2.12 | 2.21 | 2.04 | 2.27 | 2.26 | 2.18 | 1.94 | 2.09 |
| Charge D† | CB-601 isocyanate crosslinking agent from Miles Inc. (60% solids in PM Acetate) | 16.39 | 14.32 | 19.64 | 19.64 | 16.30 | 16.25 | 19.66 | 19.4 | 15.0 |
| | Ethyl Corp. ADMA-16 alkyl-dimethylamine catalyt (100% solids) | 0.91 | 0.84 | 0.88 | 0.88 | 0.90 | 0.90 | 0.87 | 0.77 | 0.83 |
| Tape Parameters | Tape width (mm) | 19 | 19 | 12.7 | 12.7 | 19 | 19 | 12.7 | 12.7 | 19 |
| | Support (PET) thickness (μm) | 9.14 | 9.14 | 9.90 | 9.90 | 9.14 | 9.14 | 9.90 | 9.90 | 9.14 |
| | Backside coating caliper range (μm) | 1.0–1.14 | 1.0–1.14 | 0.965–1.12 | 0.965–1.12 | 1.0–1.14 | 0.97–1.12 | 0.965–1.12 | 0.965–1.12 | 1.0–1.14 |

**Material is described in U.S. Pat. No. 5,028,483 col. 5, lines 32–45.
†Charges D are diluted to 19 +/− 1.0% solids in 75/10/15 MEK/toluene/cyclohexanone.

Capstan voltage is a measure of power exerted by the capstan motor shaft in a magnetic tape recording/playback device. The function of the capstan motor shaft is to pull the tape through the deck. A higher capstan voltage indicates that the capstan motor needs to exert a greater force in order to pull the tape. Therefore, the degree of ease with which the tape is transported through the deck can be determined by measuring the capstan voltage. Tapes with low friction run smoothly through a tape deck and have low capstan voltage. The change in capstan voltage which might occur after repeated use of the tape is a measure of the stability of a backside coating, especially with regard to its frictional properties. In this evaluation, two-minute tape samples (about 15.84 m) were played and rewound on a tape recording/playback device while measuring capstan voltage. The change in capstan voltage required to transport the tape through the deck was measured as a function of passes. Durable tapes had low and steady capstan voltage.

Air bleed, as measured by an air bleed tester, measures the rate at which air can escape from the backside coating, and is related to the backside surface texture. Lower air bleed values indicate more surface texture. With a lower air bleed value, wind quality of the tape improves and the tape can be processed through a slitter at a faster speed. The air bleed tester used for the present invention holds a magnetic recording tape in contact with a flat surface, the surface having grooves for exposing different areas of the tape to different air pressures. The air bleed test measured the time required for air to flow from an area of the tape exposed to atmospheric pressure, the air penetrating between the tape and the flat surface, and flowing to an area of the tape which was exposed to a reduced pressure. The time measured was the time required for the reduced pressure to recover to a preset pressure.

Table 2 compares the performance properties of Control 1, having no nonmagnetic, multicomponent particles, to Samples 2 and 3, having different amounts of these particles.

TABLE 2

| Parameter | Control 1 | Sample 1 | Sample 2 |
|---|---|---|---|
| Initial Capstan Voltage (V) | 2.98 | 2.78 | 2.78 |
| Capstan Voltage (v) after 200 passes | 3.22 | 2.75 | 2.75 |
| Air bleed (sec) | 1192.5 | 783 | 938.50 |
| Slitting Speed (feet/min) | 600 | — | 1400 |

Due to the presence of the nonmagnetic, multicomponent particles the slitting speed of Sample 2 was able to be increased by a factor of 2.3, as compared to Control 1.

The coefficient of friction (C.O.F.) of several samples was measured on a loop friction tester wherein a loop of tape is wrapped around a circular path of guides and rollers. The C.O.F. was measured between the backside surface and the surface of an aluminum pin taken from a digital video tape deck. The friction was measured on the first pass and on pass 200. Table 3 lists the results.

TABLE 3

|  | Control | Comparison |  | Sample |  |  |  |
|---|---|---|---|---|---|---|---|
|  | 1 | 1 | 2 | 3 | 3 | 4 | 5 |
| C.O.F. at 1 Pass | 0.16 | 0.15 | 0.17 | 0.14 | 0.14 | 0.135 | 0.115 |
| C.O.F at 200 passes | 0.18 | 0.19 | 0.18 | 0.185 | 0.125 | 0.105 | 0.14 |

Table 3 shows that the C.O.F. of experimental Samples 3, 4, and 5, which contain ZEEOSPHERES™ ceramic microspheres, are lower than the C.O.F. of tapes having other texturing particles, or no particles at all.

EXAMPLE 2

Tape samples Control 2, Control 3, and Sample 6 were produced according to the ingredients listed in Table 4.

TABLE 4

| Charge | INGREDIENTS | Parts by weight solids | | |
|---|---|---|---|---|
|  |  | Control 2 | Control 3 | Sample 6 |
| Particle Charge A | X-61 ZEEOSPHERES Nonmagnetic, multicomponent, particles (1.05 μm) |  |  | 7 |
|  | Phosphorylated Polyoxyalkyl Polyol** (75% solids in toluene) |  |  | 0.09 |
|  | Emcol Phosphate from Witco Corp. |  |  | 0.07 |
|  | THF* |  |  | 3.5 |
| Particle Charge B | Al$_2$O$_3$ (0.5 μm) | 3.2 |  |  |
|  | Phosphorylrated Polyoxyalkyl Polyol** (75% solids in toluene) | 0.032 |  |  |
|  | Emcol Phosphate from Witco Corp. | 0.032 |  |  |
|  | THF* | 1.1 |  |  |
| Particle Charge C | TiO$_2$ (0.5 μm) |  | 12 |  |
|  | Phosphorylated Polyoxyalkyl Polyol** (75% solids in toluene) |  | 0.12 |  |
|  | Emcol Phosphate from Witco Corp. |  | 0.12 |  |
|  | THF* |  | 4.1 |  |
| Main Charge | Estane 5703 polyurethane from BF Goodrich (15% solids in THF) | 29.8 |  |  |
|  | PKHH phenoxy resin from Union Carbide (25% solids in MEK) | 19.8 |  |  |
|  | VAGH vinyl chloride resin from Union Carbide (31.6% solids in MEK) |  | 4.7 | 5.3 |
|  | RJ-100 styrene allyl alcohol copolymer |  | 11.1 | 12.1 |
|  | from Monsanto (30% solids in MEK) |  |  |  |
|  | Hydroxy-functional polyurethane (40% solids in MEK) |  | 15.8 | 17.4 |
|  | Gulf Carbon black | 33.9 |  |  |
|  | Vulcan Carbon black from Cabot Corporation |  | 35 | 35 |
|  | Phosphorylated Polyoxyalkyl Polyol** (75% solids in toluene) | 0.7 | 0.1 |  |
|  | Emcol Acetate from Witco Corp. | 1.0 |  |  |
|  | MEK* |  | 266.8 | 279.2 |
|  | THF* | 451.7 |  |  |
| Charge D | CB-601 isocyanate crosslinking agent from Miles Inc. (60% solids in PM Acetate) | 11.5 | 18.6 | 20.0 |
|  | Ethyl Corp. ADMA-6 alkyldimethylamine catalyst (100% solids) |  | 1 | 1 |

*Denotes a 100% solvent component added to dispersion
**Material is described in U.S. Pat. No. 5,028,483 col. 5, lines 32–45.

A particle charge for each backside dispersion was produced in accordance with table 4 by mixing the nonmagnetic particles (ZEEOSPHERES™ particles, Al$_2$O$_3$, and TiO$_2$), Phosphorylated Polyoxyalkyl Polyol, and Emcol Phosphate in THF and then milling the mixture until the particles were of the appropriate mean particle size, as measured by a Microtrac II. Particle Charges A, B, and C, were prepared for Sample 6, Control 2, and Control 3 respectively.

The Main Charge for each of the above backsides was prepared by dissolving the corresponding binders and surfactants in solvent. Then carbon black was added and the mixtures were mixed and milled 4 passes in a 4-liter Netzsch horizontal sand mill. Just before coating, the Particle Charges (Charge B for Control 2, Charge C for Control 3, and Charge A for Sample 6), and the respective Charges D, were added to the Main Charges and mixed.

The backside dispersions were coated onto a 0.65 micron PET support. The backsides were coated first (coating head 1) and coating of the magnetic side followed immediately (coating head 2) on the opposite surface of the support. The tape was dried in an oven at 140°–200° F. and then surface-treated at 900 PLI pressure and 130° F. The magnetic side caliper was about 1.25 micron and the backside caliper was about 1.5 micron.

The results in Tables 5 through 8 show the superior performance of the backside containing the nonmagnetic, multicomponent particles over alumina (Control 2) and titanium dioxide (Control 3) backsides. The Sample 6 backside provides much less change in minimum tape tension, maximum drive force, coefficient of friction, and air bleed time after 5000 passes of cycling than do the controls. The Sample 6 backside is cleaner than TiO$_2$ backside. The Sample 6 backside is as non-abrasive as Al$_2$O$_3$ (fine and lower level) and TiO$_2$ backsides. The pack shift property of the Sample 6 backside is superior to Control 2. The DPSI of the Sample 6 backside is the lowest among the three samples both initially and after cycling.

The minimum tape tensions and maximum drive forces of the samples were measured in DC6525 format. The minimum tape tension was measured at 60 inches per second (ips) and the maximum drive force was measured at 120 ips. The cartridges were cycled at 120 ips in the condition of 7° F./50% RH for 5000 passes. The minimum tape tension and the maximum drive force were measured before and after cycling.

TABLE 5

Comparison of Minimum Tape Tension and Maximum Drive Force of Sample 6 Backside with Controls 2 and 3.

| Backside | Maximum Drive Force (oz) | | | Minimum Tape Tension (oz) | | |
|---|---|---|---|---|---|---|
| | 0 Pass | 5000 Pass | Percent Change | 0 Pass | 5000 Pass | Percent Change |
| Control 2 | 3.66 | 5.21 | 42.3 | 1.12 | 2.0 | 78.6 |
| Control 3 | 3.11 | 4.29 | 37.9 | 1.96 | 1.41 | −28.1 |
| Sample 6 | 3.28 | 3.91 | 19.2 | 1.12 | 1.34 | 19.6 |

The backside cleanliness of the tape was evaluated by wiping the backside during the cycling intervals of 0–1000 passes and 4000–5000 passes. The cleanliness of the backside was rated according to the amount of debris collected in the wipe. The cycling condition was 70° F./50% RH.

The coefficients of friction of the backsides of the samples were measured by an apparatus which cycles a loop of tape past a recording/playback head while monitoring the tension of the tape. The test was performed at ambient temperature and approximately 10% RH. The tape samples of approximately 36" were run at 120 ips and the coefficients of friction COF were monitored each pass. The COF of each sample at 0 and 5000 passes were measured.

TABLE 6

A Comparison of Coefficients of Friction and Cleanliness of Sample 6 Backside with Controls 2 and 3.

| Backside | Coeff. of Friction | | Backside Cleanliness | |
|---|---|---|---|---|
| | 0 Pass | 5000 Pass | 0–1000 P | 4–5000 P |
| Control 2 | 0.22 | 0.33 | 0.5 | 0.5 |
| Control 3 | 0.17 | 0.33 | 4 | 4 |
| Sample 6 | 0.15 | 0.19 | 0.5 | 0.5 |

*Note: The best rating in cleanliness is 0 and the worst is 5.

The guide pin wear of the backside was measured by the width of the wear path on the guide pin after 5000 passes of cycling. The cycling condition was 70° F./50% RH.

The pack shifts of the Sample 6 backside and Control 2 were measured by storing the cartridges in 88° F./80% RH, 117° F./10% RH, and 41° F./10% RH in sequence for 24 hours each condition. Then the cartridges were observed for any pack drop and step at flange. Approximately two minutes later, the maximum dynamic tape tension was measured. The Sample 6 backside showed no pack drop, no step at flange, and much lower maximum dynamic tape tensions than Control 2.

TABLE 7

A Comparison of Guide Pin Wear and Pack Shift of Sample 6 Backside With Controls 2 and 3.

| Backside | Guide Pin Wear (mil) after 5000 passes | | Pack Shift | | |
|---|---|---|---|---|---|
| | DC6320 format | DC6525 format | Pack Drop | Step at Flange | Max. Dyn. TT |
| Control 2 | 4.5 | 6 | 2/3 to 1 | yes | 1.92–2.36 |
| Control 3 | 6 | 7 | | | |
| Sample 6 | 5.5 | 7 | no | no | 0.48–0.99 |

The DPSI's of the samples were measured in DC6525 format at 0, 5000, and 10000 passes. The recording density was 45,000 flux change per inch (45 Kfci) at 25% threshold. The cartridges were cycled at 70° F./50% RH and the speed was 120 ips.

The DC6320 format samples were cycled for 5000 passes. Air bleed times of the backsides before and after cycling at 70° F./50% RH were measured.

TABLE 8

Comparison of Air Bleed Time and DPSI of Sample 6 Backside with Control 2 and Control 3 Backsides.

| Backside | DPSI | | | Air Bleed Time (s) | |
|---|---|---|---|---|---|
| | 0 Pass | 5000 Pass | 10000 Pass | 0 Pass | 5000 Pass |
| Control 2 | 2.7 | 1.16 | 1.15 | 210 | 609 |
| Control 3 | 1.8 | 9.23 | | 457 | 924 |
| Sample 6 | 1.5 | 0.55 | 0.57 | 409 | 693 |

EXAMPLE 3

A magnetic recording tape backside (Sample 7) according to the present invention, and two comparison samples (Control 4 and Control 5) were prepared from the ingredients listed in Table 9.

To prepare each backside dispersion, the components of the respective Main Charges were combined and milled until smooth. In separate millings, the components of Particle Charges A (for Sample 7) and B (for Control 4) were combined and milled until the particles were of the appropriate mean particle sizes. Control 5 did not have a particle charge. Prior to coating, the Main Charge of each backside was combined with the respective particle charge (Charge A for Sample 7, Charge B for Control 4), and the respective activators and catalyst, if any (Charge D). The charges were blended together to form the backside dispersions, which were then coated onto magnetic film-bearing supports. Sample 7 and Control 4 were coated onto a 3M OX-50 56 gauge PET support, while Control 5 was coated onto a TORAY Q5XH 39 gauge PET support, each support had previously been coated with a magnetic coating on the opposite side. The resultant backside coating was then dried in an oven and both sides of the tape were subjected to a calendering process at the same time.

TABLE 9

| Charge | Ingredients | Parts by weight solids | | |
|---|---|---|---|---|
| | | Sample 7 | Control 4 | Control 5 |
| Particle Charge A | X-61 ZEEO-SPHERES ™ (1.0 μm) nonmagnetic, multicomponent particles | 11.8 | | 7 |
| | Phosphorylated polyoxyalkyl polyol** (75% solids in toluene) | 0.16 | | |
| | Emcol Phosphate from Witco Corp. | 0.12 | | |
| | THF* | 5.9 | | |
| Particle Charge B | Norton E-330 $Al_2O_3$ (0.9 μm) | | 10.9 | |
| | Phosphorlrated polyoxyalkyl polyol** (75% solids in toluene) | | 0.58 | |
| | Polyester polyurethane (25% in MEK) | | 0.12 | |
| | VAGH vinyl chloride resin (31.6% in MEK) | | 0.058 | |
| | MEK* | | 3.24 | |
| | Toluene* | | 0.94 | |
| | Cyclohexanone* | | 0.80 | |
| Main Charge | Regal 660R Carbon black | 33.1 | 29.0 | |
| | Modul L Carbon black | | 0.6 | |
| | Vulcan 1930 Carbon black | | | 41.3 |
| | $TiO_2$ | 8.3 | 7.3 | 10.3 |
| | EC-130 vinyl chloride-acrylate copolymer from Sekisui Chemical Co. (20% solids in MEK) | 20.6 | | |
| | Mercaptosuccinic acid-functionalized polyurethane*** (40% solids in MEK) | 21.4 | | |
| | Lecithin (57% solids in 2:1 MEK: Toluene) | | 2.1 | 2.4 |
| | VAGH vinyl chloride resin from Union Carbide (31.6% solids in MEK) | | 5.0 | 4.8 |
| | RJ-100 styrene-allyl alcohol copolymer | | 10.4 | 11.3 |
| | from Monsanto (30% solids in MEK) | | | |
| | Hydroxy-functional polyether polyurethane (40% solids in MEK) | | 16.1 | 16.2 |
| | MEK* | 248 | 165 | 165 |
| | Toluene* | 107 | 23.6 | 22.0 |
| | Cyclohexanone* | | 47.2 | 33.0 |
| Charge D | Ethyl Corp. ADMA-6 alkyldimethylamine catalyst (100% solids) | | 0.6 | 0.7 |
| | CB-701 isocyanate crosslinking agent from Miles Inc. (75% solids in THF) | 4.8 | | |
| | CB-601 isocyanate crosslinking agent from Miles Inc. (60% solids in PM acetate) | | 17.6 | 13.0 |

*Denotes a 100% solvent component added to dispersion
**Material is described in U.S. Pat. No. 5,028,483 col. 5, lines 32–45.
***Refers to the material described in Assignee's copending application U.S. Ser. No. 08/054511 filed 04/27/93 in the name of Carlson for Carboxylic-acid functional polyurethane polymers and their use in magnetic recording media.

Tape path drag is the measure, in newtons (N), of the friction between a backcoat and the internal components of a magnetic recording tape cartridge, e.g. guide pins, rollers, etc. Tape path drag is measured by monitoring the differential force between media entering and exiting a tape drive.

Guiding is a measurement, in microns, of the vertical movement of a recording tape across a magnetic tape recording head, while the tape is being transported horizontally past the tape head. Such movement can lead to playback errors, so less movement, and lower values are better. Guiding measurements are taken with a Fotonic sensor at the edge of a tape.

Evaluations show that the Sample 7 backside coating exhibits stacking, guiding, and tape path drag performance superior to Controls 4 and 5. A visual observation of abrasive wear on the metal bearings in the cartridge was lowest with the Sample 7 backcoat. Test results are given in Table 10.

TABLE 10

| | Air Bleed | Coat Calip | Speed M/sec | Stacking FWD | Stacking REV | Guiding μm FWD | Guiding μm REV | Path Drag N FWD | Path Drag N REV |
|---|---|---|---|---|---|---|---|---|---|
| Sample 7 | 160 s | 25 μ" | 1.1 | VG | VG | 7 | 7 | 0.33 | 0.43 |
| | | | 2.2 | VG | VG | 7 | 7 | 0.16 | 0.16 |
| | | | 3.0 | VG | VG | 7 | 8 | 0.10 | 0.10 |
| | | | 4.0 | VG | VG | 7 | 11 | 0.08 | 0.06 |
| | | | 5.0 | VG | VG | 8 | 12 | 0.06 | 0.06 |
| | | | 6.0 | G | VG | 13 | 16 | 0.06 | 0.06 |
| | | | 7.0 | G | VG | 12 | 14 | 0.07 | 0.05 |
| | | | 8.0 | F | VG | 11 | 13 | 0.09 | 0.08 |
| Control 4 | 350 s | 30 μ" | 1.1 | VG | VG | 6 | 6 | 0.41 | 0.43 |
| | | | 2.2 | VG | VG | 6 | 6 | 0.21 | 0.22 |
| | | | 3.0 | VG | VG | 8 | 12 | 0.17 | 0.17 |
| | | | 4.0 | F | VG | 8 | 23 | 0.16 | 0.16 |
| | | | 5.0 | P | G | 17 | 70 | 0.16 | 0.14 |
| Control 5 | 1000 s | 50 μ" | 1.1 | G | VG | 10 | 20 | 0.13 | 0.13 |
| | | | 2.2 | F | F | 40 | 43 | 0.14 | 0.13 |
| | | | 3.0 | F | P | 58 | 60 | 0.10 | 0.13 |
| | | | 4.0 | P | P | 65 | 68 | 0.09 | 0.10 |

VG = Very Good
G = Good
F = Fair
P = Poor

What is claimed is:

1. A magnetic recording medium comprising a support having two major surfaces, a magnetic layer provided on one major surface of said support, and a backside coating provided on the other major surface of said support wherein:

said backside coating comprises nonmagnetic, multicomponent particles dispersed in a polymeric binder, said particles being comprised of a first component having a Mohs hardness equal to or less than 7 and a second component having a Mohs hardness greater than 7.

2. The magnetic recording medium of claim 1, wherein the first component is selected from the group consisting of $SiO_2$, $TiO_2$, $CaCO_3$, $\alpha$-$Fe_3O_4$, $\alpha$-$Fe_2O_3$, $ZrO_2$, NiO, and $Fe_2SiO_4$ and mixtures thereof.

3. The magnetic recording medium of claim 1, wherein the second component is chosen from the group consisting of $Al_2O_3$, topaz, $MgAl_2O_4$, SiC, diamond, and $BeAl_2O_4$ and mixtures thereof.

4. The magnetic recording medium of claim 1, wherein the first component is $SiO_2$.

5. The magnetic recording medium of claim 1, wherein the first component is $SiO_2$ and the second component is $Al_2O_3$.

6. The magnetic recording medium of claim 1, wherein the first component is $SiO_2$ and the second component is $Al_2O_3$, and the particles further comprise one or more of $TiO_2$, $\alpha$-$Fe_2O_3$, $ZrO_2$, and $Fe_2SiO_4$.

7. The magnetic recording medium of claim 6, wherein the first component is $SiO_2$, the second component is $Al_2O_3$, and the particles further comprise $\alpha$-$Fe_2O_3$.

8. The magnetic recording medium of claim 6 wherein the first component is $SiO_2$, the second component is $Al_2O_3$, and the particles further comprise $\alpha$-$Fe_2O_3$, and one or more of $TiO_2$, $ZrO_2$, and $Fe_2SiO_4$.

9. The magnetic recording medium of claim 8, wherein the first component is $SiO_2$, the second component is $Al_2O_3$, and the particles further comprise $\alpha$-$Fe_2O_3$, and $TiO_2$.

10. The magnetic recording medium of claim 9, wherein:

the weight ratio of first component to second component is within the range from 1:1 to 3:1;

the weight ratio of first component to third component is within the range from 4:1 to 19:1; and the weight ratio of first component to fourth component is within the range from 19:1 to 99:1.

11. The magnetic recording media of claim 8, wherein the particles comprise about 47 parts by weight $SiO_2$, about 29 parts by weight $Al_2O_3$, about 7 parts by weight $\alpha$-$Fe_2O_3$, and about 2 parts by weight $TiO_2$.

12. The magnetic recording medium of claim 1, wherein the backside coating further comprises $TiO_2$ particles.

13. The magnetic recording medium of claim 1, wherein the particles are present in the backside coating in an amount up to about 12 parts by weight based on 100 parts backside coating.

14. The magnetic recording medium of claim 1, wherein the particles are present in the backside coating in an amount in the range from about 0.25 to 2 parts by weight based on 100 parts backside coating.

15. The magnetic recording medium of claim 14, wherein the backside coating further comprises $TiO_2$ particles.

16. The magnetic recording medium of claim 1, wherein the particles are present in the backside coating in an amount in the range from about 0.50 to 0.75 parts by weight based on 100 parts backside coating.

17. The magnetic recording medium of claim 1, wherein the particles are present in the backside coating in an amount in the range from about 7 to 11 parts by weight based on 100 parts backside coating.

18. The magnetic recording medium of claim 1, wherein the particles are present in the backside coating in an amount in the range from about 7 to 9 parts by weight based on 100 parts backside coating.

19. The magnetic recording medium of claim 1, wherein the particles have a mean particle size in the range from about 0.4 to 1.2 microns.

20. The magnetic recording medium of claim 1, wherein the particles have a mean particle size in the range from about 0.95 to 1.05 microns.

21. The magnetic recording medium of claim 1, wherein the surface roughness Rq of the backside coating is in the range from about 0.05 to 0.6 micron.

22. The magnetic recording medium of claim 1, wherein the surface roughness Rq of the backside coating is in the range from about 0.1 to 0.4 micron.

23. The magnetic recording medium of claim 1, wherein said particles have a mean particle size that is substantially equal to the thickness of the backside coating.

24. The magnetic recording medium of claim 1, wherein said particles comprise fragments of multicomponent, hollow, ceramic microspheres.

25. The magnetic recording medium of claim 1, wherein a portion of said particles are substantially spherical.

* * * * *

UNITED STATES PATENT AND TRADEMARK OFFICE
CERTIFICATE OF CORRECTION

PATENT NO.: 5,607,747

DATED: March 4, 1997

INVENTOR(S): Law et al.

It is certified that error appears in the above-identified patent and that said Letters Patent is hereby corrected as shown below:

Col. 15, line 6, delete "7" under Control 5 column of Table 9.

Signed and Sealed this

Twenty-third Day of December, 1997

Attest:

BRUCE LEHMAN

Attesting Officer

Commissioner of Patents and Trademarks